US008903978B2

(12) United States Patent
Zerr et al.

(10) Patent No.: US 8,903,978 B2
(45) Date of Patent: Dec. 2, 2014

(54) METHOD AND APPARATUS FOR PAIRING A MOBILE DEVICE TO AN OUTPUT DEVICE

(75) Inventors: Derin M. Zerr, Sioux Falls, SD (US); John S. Prince, III, Sioux Falls, SD (US); James L. Fenno, Sioux Falls, SD (US); John B. Baker, Sioux Falls, SD (US)

(73) Assignee: Sonifi Solutions, Inc., Sioux Falls, SD (US)

( * ) Notice: Subject to any disclaimer, the term of this patent is extended or adjusted under 35 U.S.C. 154(b) by 0 days.

(21) Appl. No.: 13/488,809

(22) Filed: Jun. 5, 2012

(65) Prior Publication Data

US 2012/0322384 A1 Dec. 20, 2012

Related U.S. Application Data

(63) Continuation-in-part of application No. 13/243,491, filed on Sep. 23, 2011.

(60) Provisional application No. 61/496,702, filed on Jun. 14, 2011.

(51) Int. Cl.
G06F 15/173 (2006.01)
G08C 17/02 (2006.01)
H04L 29/08 (2006.01)

(52) U.S. Cl.
CPC ............. *H04L 67/303* (2013.01); *G08C 17/02* (2013.01); *G08C 2201/21* (2013.01)
USPC ........................................................ 709/223

(58) Field of Classification Search
None
See application file for complete search history.

(56) References Cited

U.S. PATENT DOCUMENTS

| 4,198,870 A | 4/1980 | Barker et al. |
| 4,564,732 A | 1/1986 | Lancaster et al. |
| 5,455,619 A | 10/1995 | Truckenmiller et al. |

(Continued)

FOREIGN PATENT DOCUMENTS

| CA | 2788573 | 11/2012 |
| CA | 2790354 | 3/2013 |

(Continued)

OTHER PUBLICATIONS

International Search Report and Written Opinion for International (PCT) Patent Application No. PCT/US2012/042190, mailed Jul. 25, 2012, 11 pages.

(Continued)

*Primary Examiner* — Brian P Whipple
(74) *Attorney, Agent, or Firm* — Sheridan Ross P.C.

(57) ABSTRACT

Methods and systems for associating or pairing a mobile device with a local output device via a central or mobile connect server system are provided. Pairing is performed by initiating a pairing request from an output device that is passed to the mobile connect server for processing. The mobile connect server responds to the request with a pairing code that is displayed by the output device. A user of the mobile device then enters the displayed pairing code in the mobile device. The mobile device transmits the entered pairing code to the mobile connect server and, in response to a match, the mobile device is paired to the output device. Pairing can enable various functions, including an ability to apply stored user preference data to control programming or other information displayed by the output device in response to commands entered in the mobile device.

21 Claims, 6 Drawing Sheets

(56) References Cited

U.S. PATENT DOCUMENTS

| | | |
|---|---|---|
| 5,506,572 A | 4/1996 | Hills et al. |
| 5,641,319 A | 6/1997 | Stoel et al. |
| 5,675,828 A | 10/1997 | Stoel et al. |
| 5,905,942 A | 5/1999 | Stoel et al. |
| 5,907,715 A | 5/1999 | Stoel et al. |
| 6,226,677 B1 | 5/2001 | Slemmer |
| 6,240,533 B1 | 5/2001 | Slemmer |
| 6,343,315 B1 | 1/2002 | Stoel et al. |
| 6,377,990 B1 | 4/2002 | Slemmer et al. |
| 7,272,844 B1 | 9/2007 | Bankers et al. |
| 7,380,031 B2 | 5/2008 | Jones et al. |
| 7,444,663 B2 | 10/2008 | Fenwick, Jr. et al. |
| 7,895,630 B2 | 2/2011 | McKenna et al. |
| 7,930,721 B1 | 4/2011 | Hernes |
| 7,971,782 B1* | 7/2011 | Shams ............ 235/379 |
| 8,214,429 B2* | 7/2012 | Chidel et al. ............ 709/203 |
| 8,285,851 B2* | 10/2012 | Robbin et al. ............ 709/227 |
| 8,356,251 B2 | 1/2013 | Strober |
| 2002/0052965 A1 | 5/2002 | Dowling |
| 2006/0107299 A1 | 5/2006 | Bartfeld et al. |
| 2008/0141313 A1* | 6/2008 | Kato et al. ............ 725/62 |
| 2008/0168129 A1* | 7/2008 | Robbin et al. ............ 709/203 |
| 2009/0172780 A1 | 7/2009 | Sukeda et al. |
| 2010/0069115 A1* | 3/2010 | Liu ............ 455/556.1 |
| 2010/0176919 A1* | 7/2010 | Myers et al. ............ 340/5.73 |
| 2010/0330979 A1* | 12/2010 | Harris ............ 455/420 |
| 2011/0116452 A1 | 5/2011 | Welch et al. |
| 2011/0244829 A1* | 10/2011 | Kase ............ 455/411 |
| 2011/0314497 A1 | 12/2011 | Warrick et al. |
| 2012/0072951 A1 | 3/2012 | King |
| 2012/0096503 A1* | 4/2012 | Slothouber et al. ............ 725/110 |
| 2012/0159538 A1* | 6/2012 | Phillips et al. ............ 725/34 |
| 2012/0166628 A1 | 6/2012 | Kullos |
| 2012/0272147 A1 | 10/2012 | Strober |
| 2012/0324076 A1* | 12/2012 | Zerr et al. ............ 709/223 |
| 2013/0051237 A1 | 2/2013 | Ong |
| 2013/0081093 A1 | 3/2013 | Cassidy et al. |
| 2013/0097286 A1* | 4/2013 | Robbin et al. ............ 709/219 |
| 2013/0124759 A1 | 5/2013 | Strober |
| 2013/0239199 A1 | 9/2013 | Ong |
| 2013/0297723 A1 | 11/2013 | Iwaniszyn |
| 2013/0305320 A1 | 11/2013 | Warrick et al. |
| 2013/0305341 A1 | 11/2013 | Baker et al. |
| 2013/0346808 A1 | 12/2013 | Gyorffy |
| 2013/0347028 A1 | 12/2013 | Warrick et al. |
| 2014/0026162 A1 | 1/2014 | Cassidy et al. |
| 2014/0053282 A1 | 2/2014 | Court |
| 2014/0089524 A1 | 3/2014 | Carriere |
| 2014/0090030 A1 | 3/2014 | Ong |
| 2014/0143380 A1 | 5/2014 | Warrick et al. |
| 2014/0189759 A1 | 7/2014 | Warrick et al. |
| 2014/0245395 A1 | 8/2014 | Hulse et al. |
| 2014/0250460 A1 | 9/2014 | Hulse et al. |
| 2014/0250470 A1 | 9/2014 | Warrick |
| 2014/0289410 A1 | 9/2014 | Smith et al. |
| 2014/0304722 | 10/2014 | Ostlund |

FOREIGN PATENT DOCUMENTS

| | | |
|---|---|---|
| CA | 2817932 | 12/2013 |
| CA | 2820654 | 12/2013 |
| EP | 0094839 | 11/1983 |
| WO | WO 2009/137247 | 11/2009 |
| WO | WO 2012/145227 | 10/2012 |

OTHER PUBLICATIONS

Official Action for U.S. Appl. No. 13/243,491 mailed May 17, 2013, 12 pages.

International Preliminary Report on Patentability for International (PCT) Patent Application No. PCT/US2012/042190 mailed Jan. 3, 2014, 8 pages.

Official Action for U.S. Appl. No. 13/243,491, mailed Oct. 10, 2013, 15 pages.

* cited by examiner

| | Lineup: | Amenity HD IPTV |
|---|---|---|
| | Cables: | IP |
| | Tuner: | ATSC/NTSC |
| | Format: | MPEG-2 |
| 612 | Power On: | 102 |
| 616 | Accessing: | 100      608 |
| | BAT: | false |

| Channel Mask | Display | Name |
|---|---|---|
| • | 1 | Promo |
| • | 4 | CBS HD – KELO |
| • | 5 | NBC – KDLT |
| • | 8 | ABC HD – KSFY |
| • | 9 | Our Food |
| • | 10 | Sleep TV |
|  | 11 | Conference |
| • | 13 | ESPN HD |
| • | 21 | TNT HD |
| • | 22 | DISCOVERY HD |
|  | 24 | HBO 2 |
| X | 30 | Playboy TV |
| * | 50 | 704 – NFL |
| * | 51 | 705 – NFL |
| * | 52 | 706 - NFL |
|  | 100 | Accessing |
|  | 101 | Welcome |
|  | 102 | Welcome 2 |
| * | 201 | Reserved 1 (Virtual DVR) |
| * | 202 | Reserved 2 (User Data Store) |

METHOD AND APPARATUS FOR PAIRING A MOBILE DEVICE TO AN OUTPUT DEVICE

CROSS-REFERENCE TO RELATED APPLICATIONS

This application is a continuation-in-part of U.S. patent application Ser. No. 13/243,491, filed Sep. 23, 2011, which claims the benefit of U.S. Provisional Patent Application Ser. No. 61/496,702, filed Jun. 14, 2011, the entire disclosures of which are hereby incorporated herein by reference.

FIELD

Methods and systems for applying user preferences associated with a mobile device to a paired output device are disclosed.

BACKGROUND

Televisions for providing audio-visual entertainment to guests are commonly available as part of hotel rooms. Often times televisions and other entertainment systems for use in the lodging industry are associated with distribution systems that permit guests to select from a variety of programming. This programming can include regular off-air television programs, pay per view movies, Internet access, and guest services such as video shopping and video checkout. In addition, hotel entertainment systems typically include a headend or property management server that is located within the lodging facility and that is linked to guest terminals in the individual guest rooms by a distribution system. The local client server generally controls the delivery of selected content to the room terminal, and the application of any associated charges to the room bill. In selecting content, the guest typically provides input using a remote control provided as part of the interactive equipment in the room. Similar systems can be deployed in hospitals or other facilities for the delivery of entertainment or other services to patient rooms.

Increasingly, mobile devices, such as mobile telephones or smart phones, are used as a primary interface with communication and entertainment systems. These interactive features are often accessed as or through applications or "apps" that are resident on the mobile device. Although apps can include applications that deliver audio-visual content to the user, the relatively small format of most mobile devices often provides a less than optimum user experience. Therefore, in a hospitality setting, it is desirable to make use of the entertainment equipment provided as part of a room's entertainment system. Although various wireline and wireless communication protocols are available that are capable of supporting communications between a mobile device and a room entertainment system, the hardware required to establish such links is often not a part of existing room entertainment equipment. In addition, simply connecting a user's mobile device to room entertainment devices has the effect of merely substituting a conventional remote control device for the mobile device, and does not itself enable any additional functionality.

Mobile devices are also used to store user specific information. This user specific information can include information controlling modes of operation of the device, the arrangement of data and applications, and the implementation of various filters that control the user experience and/or the capabilities of the associated mobile device. Users of mobile devices therefore increasingly expect a consistent experience across applications. Accordingly, extending a user interface that implements such user preferences to other devices would be an advantage.

SUMMARY

Embodiments of the present invention are directed to solving these and other problems and disadvantages of the prior art. In accordance with embodiments of the present invention, systems and methods for associating or pairing a mobile device with an output device included as part of an interactive system are provided. More particularly, embodiments of the present invention enable the application of user preferences associated with the mobile device to the operation of the output device and/or the interactive system. In general, the mobile device is provided with a mobile application or mobile app, and is registered with a mobile connect server. In order to initiate pairing, the user enters a request for a pairing code via the interactive system or equipment. In response to the request, the mobile connect server returns a pairing code that is displayed or otherwise output to the user by the output device. The user then enters the pairing code in the mobile app on their mobile device. The mobile app returns the entered pairing code to the mobile connect server. In response to a match between the pairing code provided to the interactive equipment for output to the user and the pairing code entered in the user's mobile device and provided to the mobile connect server, the mobile device is paired to the interactive system. The user can then implement the application of user preferences associated with the mobile device by the interactive system. In addition, the user can access personalized content, order other available content, and/or authorize payment for content or services.

A system in accordance with embodiments of the present invention can include a mobile device running a mobile application. The mobile device can be capable of operating as an endpoint of a communication link between the mobile device and the mobile connect server. Communications between the mobile device and the mobile connect server can be over various networks, such as a wireless carrier network, a wireline carrier network, a wireless or wireline local area network, and a wireless or wireline wide area network, including but not limited to the Internet. The mobile connect server is interconnected to a plurality of room interactive or entertainment systems that include terminal or output devices. This connection can be established over the Internet, and/or a proprietary network. In accordance with still other embodiments, a local client server can be interposed between the mobile connect server and at least some of the room output devices. As an example, a local client server can comprise a headend system that operates to provide selected programming to interconnected interactive or output devices at a hotel or other property having a number of output devices.

The mobile device is generally associated with user preference data or information. Such user preference data can be stored on the mobile device. Alternatively or in addition, user preference data associated with the mobile device can be stored on a device other than the mobile device that is accessible to the user over a communication link. For instance, the mobile application can utilize the communication link to access the user preference data. As a further example, user preference data stored on a device other than the mobile device can be accessed after user permission has been obtained, for example through a suitable authorization granted by the mobile application. The user preference data can be applied to control various aspects of the user experience or interface presented to the user by the interactive system. As a particular example, but without limitation, user preference data can include information controlling the data sources available through interactive systems or equipment after the mobile device has been paired to an output device associated with the interactive system or equipment. For instance, the user preference data can act to block the receipt of television channels or other sources of information that the user does not want to have available. The user preference data can also be used to determine a channel lineup or ordering. As a further example, the user preference data can provide subscription information to enable the receipt of premium content available under a subscription plan. In accordance with still other embodiments, the user preference data can include payment information to enable the receipt of pay per view or other premium content without requiring or while reducing the amount of manual input required by the user to access such content.

Methods in accordance with embodiments of the present invention include initiating a request for a pairing code for use in association with a selected terminal or output device. The request is sent to a mobile connect server, which responds with a pairing code. The returned pairing code is displayed or otherwise output to a user. The pairing code is then entered into a mobile application running on a user's mobile device. Entering the pairing code in the mobile application can include manual entry of the pairing code by the user in the mobile device. As another example, entering the pairing code can include scanning or photographing a representation of the pairing code comprising, for example a bar code or a quick response (QR) code. The mobile app in turn delivers the entered pairing code to the mobile connect server. Delivery of the pairing code to the mobile connect server can be accomplished using a communication link established between the mobile device and the mobile connect server. The communication link between the mobile device and the mobile connect server can include but is not limited to a carrier wireline or wireless network, a Wi-Fi or wireline Ethernet network, or combinations of network types and protocols. In response to receipt of a pairing code that matches the pairing code output by the terminal device, the mobile device is associated with or paired to the output device. In response to a valid pairing, various information can be displayed to the user by the mobile device, such as menus, channel guides, interactive program guides, and the like. Moreover, selections made by the user through the mobile device with respect to programming and/or other services can control operation of the output device.

Additional features and advantages of embodiments of the present invention will become more readily apparent from the following detailed description, particularly when taken together with the accompanying drawings.

BRIEF DESCRIPTION OF THE DRAWINGS

FIG. 6 illustrates an example channel lineup resulting from the application of user preference information in accordance with embodiments of the present invention.

DETAILED DESCRIPTION

Figure 1:
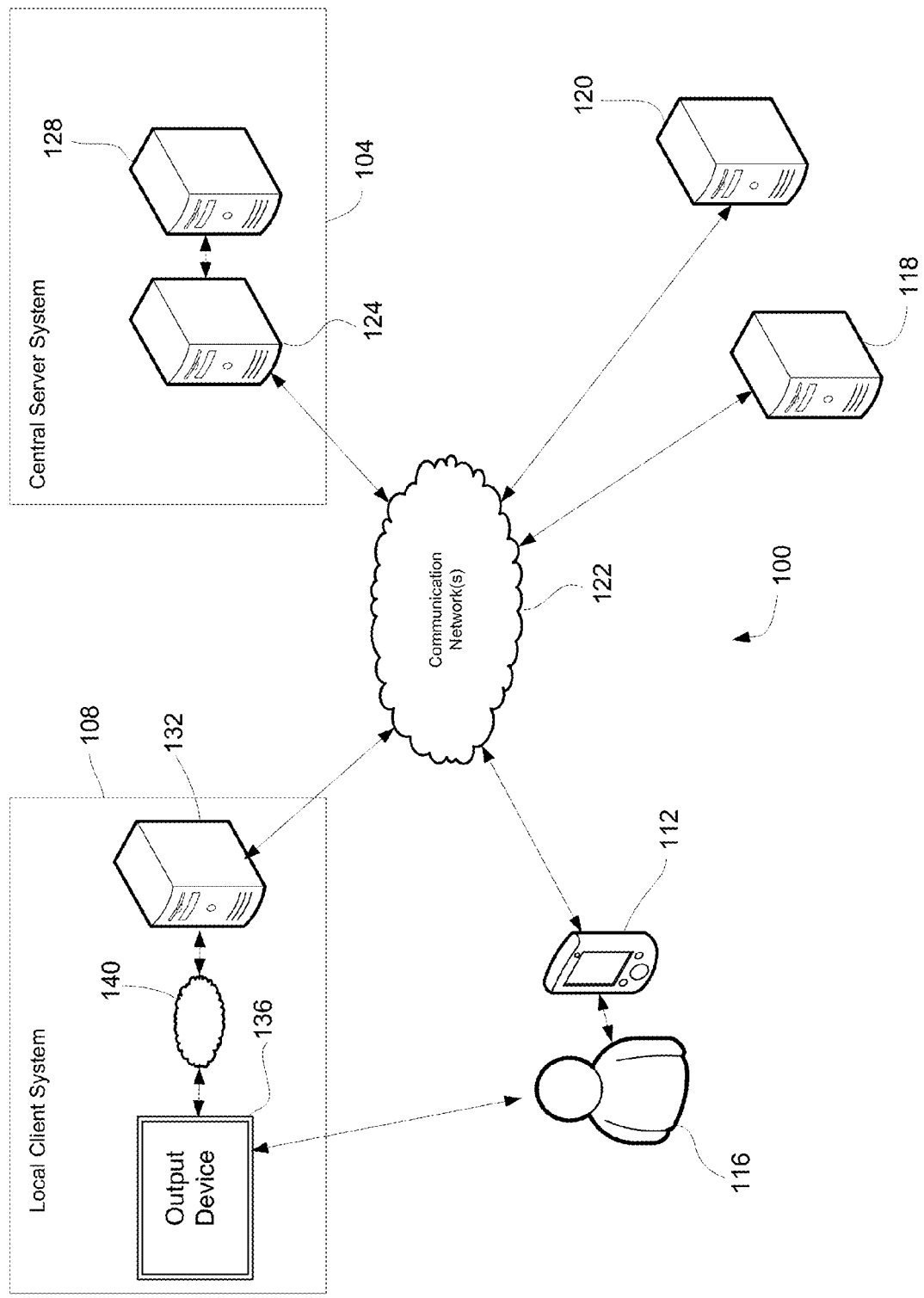
FIG. 1 depicts elements of a system incorporating a mobile device interface in accordance with embodiments of the present invention.

FIG. 1 depicts elements of a system 100 that enables and supports pairing of a terminal or output device with a mobile application in accordance with embodiments of the present invention. The system 100 generally includes a central server system 104, a local client system 108, and a mobile device 112. The mobile device 112 is generally associated with a user 116. Optionally, the system 100 can include a user data store 118 and/or a mobile application server 120 that are separate from the mobile device 112. These system devices or nodes 104, 108 and 112 can be interconnected by one or more networks 122. Moreover, different networks 122 can interconnect different nodes 104, 108 and 112.

The central server system 104 generally includes a mobile connect server 124. As described in greater detail elsewhere herein, the mobile connect server 124 operates as a central or control node in pairing a terminal or output device, hereinafter referred to as an output device 136 with a mobile device 112 and with enabling control of aspects of the operation of the output device 136 in response to input provided at the mobile device 112. Optionally, the central server system 104 can also include a data server 128. The data server 128 can provide various data and information to other components or nodes of the system 100, for example via the mobile connect server 124. Examples of such data include channel lists, TV program data and interactive program guide information.

The local client system 108 is an interactive system typically associated with a physical location, or a group of related physical location, such as a lodging or healthcare facility. Thus, in one exemplary application, the local client system 108 can be associated with a hotel having any number of guest rooms. The local client system 108 generally includes a site or local client server 132. The local client server 132 generally functions as a headend for data and information provided by or in association with the central server system 104. Moreover, the local client server 132 connects the local client system 108 to the central server system 104. Although for ease of illustration a single local client system 108 is illustrated in FIG. 1, a system 100 can include a plurality of local client systems 108 interconnected to a common central server system 104. The local client server 132 is interconnected to an output device 136 via a local client network or distribution system 140. In particular, data and information, such as audio-visual content, interactive program guides, and the like, can be passed from the local client server 132 to the output device 136 via the local client network 140. Input entered at the output device 136, either directly or through a remote control or other device, such as a wireless keyboard, associated with the output device 136 can be passed back to the local client server 132 via the local client network 140.

In addition to delivering content to an output device 136 and to handling input associated with requests for content, the local client server 132 can perform various administrative tasks. These administrative tasks can include associating charges, for example in connection with lodging, healthcare or other guest based services, for pay per view content or other content or services associated with specific charges to a room containing the output device 136 to which the content or service is delivered. In accordance with embodiments of the present invention, the local client network 140 can comprise an Internet protocol network, some other digital network, and/or an analog network. Moreover, the local client network 140 can support radio frequency (RF) connections between the output device 136 and the local client server 132, including wireline RF connections.

An output device 136 can include various audio-visual equipment, including but not limited to a high definition television, a standard definition television, a surround sound receiver, and/or speakers. In addition, an output device 136 can include an integrated terminal processor, a computer, and/or can be associated with a set top box or other separate component, to support two-way communications between the output device 136 and the local client server 132. Accordingly, the output device 136 can support the display of interactive menus and program guides, and the receipt of selections provided by a user or other user input that is relayed to the local client server 132. User input can be provided through keypads, touch screen displays, remote control devices or the like provided as part of the output device 136, for example as part of a set top box, game console, or television.

The mobile or user device 112 generally includes a device that is associated with a particular user 116. Examples of a mobile device 112 include a smart phone, tablet computer, laptop computer, or other mobile computing device. Moreover, the mobile device 112 generally supports execution of a mobile application, as described in greater detail elsewhere herein. Although for ease of illustration and description a single mobile device 112 and user 116 pair is illustrated in FIG. 1, a system 100 can support multiple mobile devices 112 and associated users 116.

The optional user data store 118 can be used to store or maintain user 116 specific information. Such information can include user preference information or data, as described in greater detail elsewhere herein. The data stored on a user data store 118, if provided, associated with a particular user 116 can be accessed by that user 116, for example after authorization received at the user data store 118 from a mobile device 112. Moreover, authorization can include an instruction to provide user preference data from the user data store 118 to a central data store 104 or a local client system 108, either directly or through an associated mobile device 112. The user data store 118 can, for example, comprise a general purpose computer and/or a network attached data storage system.

The optional mobile application server 120 can handle various duties, such as the delivery or download of a mobile application to the mobile device 112 to facilitate interconnection and interoperability of the mobile device 112 with the remainder of the system 100. If provided, a mobile application server 120 can also handle registration of a particular mobile device 112 and/or user 116 with the system 100. Other operations that can be provided or supported by a mobile application server 120 include providing information concerning the programming or other amenities available at properties having compatible property management systems 108, for example in the vicinity of the mobile devices 112 current location, or at a location selected by the user 116. The mobile application server can also provide content for display on the mobile device 112, including audio-video content, such as promotional materials, advertisements, video on demand, or other content. Alternatively, such functionality and features can be provided by, for example, the mobile connect server 124.

In general, operation of the system 100 includes action by a user 116 to download a mobile application on their mobile device 112. Downloading the mobile application can be through establishing a connection between the mobile device 112 and a mobile application server 120 and/or a mobile connect server 124. Downloading can include registration with a mobile application server 120 and/or a mobile connect server 124. After installing and, if required by the particular implementation of the system 100, registering the mobile application, the user 116 has the option of pairing their mobile device 112 with an output device 136, to enable control of the output device 136 using the mobile device 112, where such control interaction involves commands entered in the mobile device 116 that are passed through and/or processed by the central server system 104.

Figure 2:
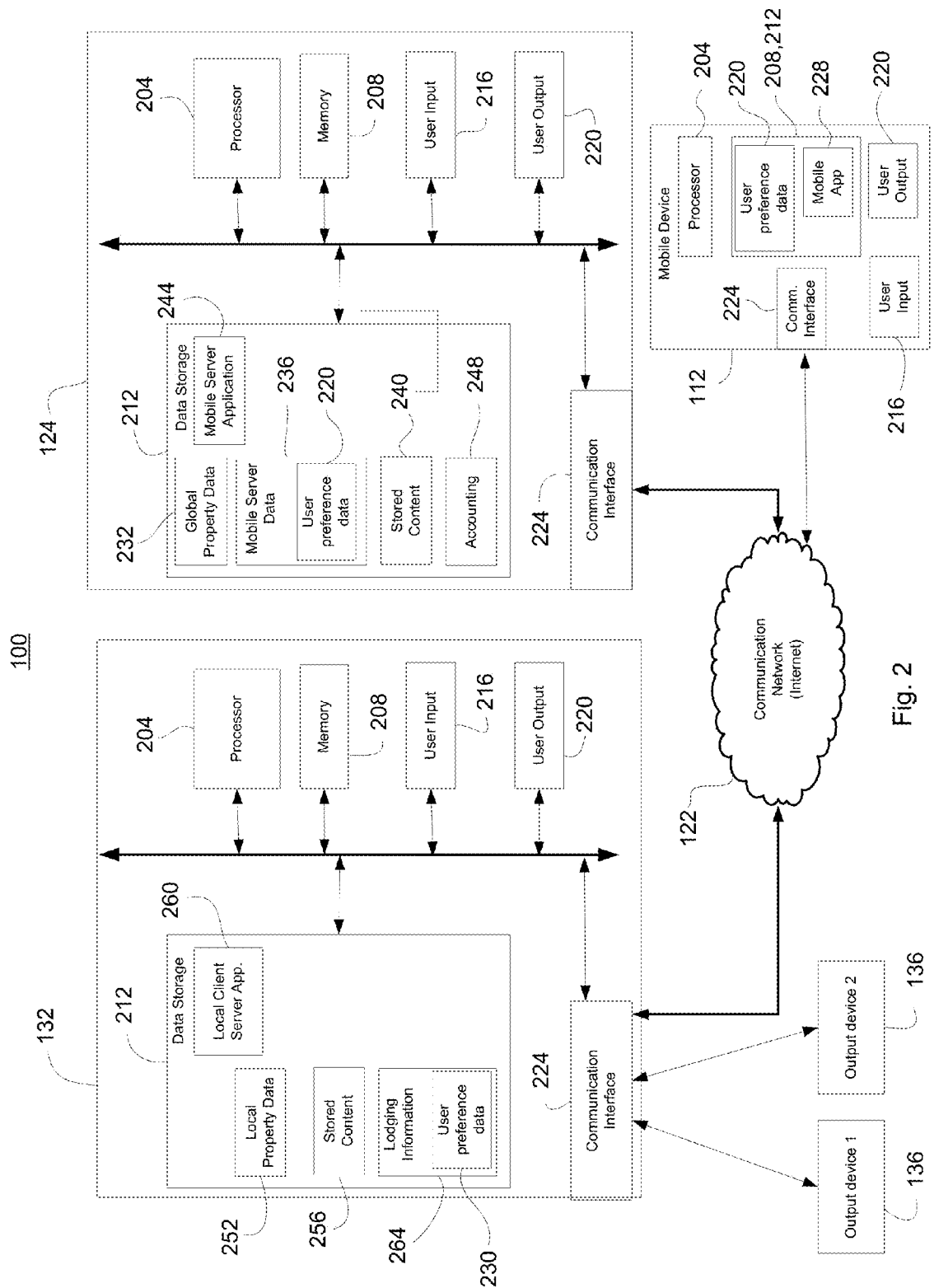
FIG. 2 is a block diagram depicting components of a system in accordance with embodiments of the present invention.

With reference now to FIG. 2, additional aspects and components of a system 100 in accordance with embodiments of the present invention are depicted. Each mobile device 112, mobile connect server 124, and local client server 132 include a processor 204 and memory 208. The processor 204 may comprise a general purpose programmable processor or controller for executing application programming or instructions. As a further example, the processor 204 may comprise a specially configured application specific integrated circuit (ASIC). The processor 204 generally functions to run programming code or instructions, such as applications or programs, implementing various functions of the associated device or node 112, 124 or 132. As can be appreciated by one of skill in the art after consideration of the present disclosure, different devices 112, 124 and 132 will typically have different processors 204, depending on the functions and capabilities of the associated device 112, 124 or 132. The memory 208 is generally used in connection with the execution of application programming by the processor 204, and for the temporary or long term storage of program instructions and/or data. As examples, the memory 208 may comprise removable secure digital storage, RAM, SDRAM, or other solid state memory. Moreover, some or all of the memory 208 may be integral to the processor 204.

A device 112, 124 or 132 can also include data storage 212. In accordance with embodiments of the present invention, data storage 212 can contain program code or instructions implementing various applications or functions executed by the associated device 112, 124 or 132. Like the memory 208, the data storage 212 can comprise a solid state memory device. In addition, in certain applications, the data storage 212 can be integrated with and/or indistinguishable from the memory 208, for instance on certain mobile devices 112. Alternatively or in addition, the data storage 212 may comprise a hard disk drive or other random access memory, and can be integral to the associated device 112, 124 or 132, or can be interconnected to the device, for example as network attached storage.

A device or node 112, 124 or 132 can also be associated with one or more user input devices 216. Examples of user input devices 216 can include keyboards, touch screen displays, position encoders such as a touchpad, mouse, or track ball, associated with a display, switches, or any other device capable of receiving input from a user 116. In addition, a device 112, 124 or 132 can be associated with one or more user output devices 220. Examples of user output devices 220 include displays, speakers, and indicator lamps.

In addition, each node 112, 124 or 132 can include one or more communication interfaces 224. The type of communication interface or interfaces 224 associated with a particular node 112, 124 or 132 is typically determined by the type of communication network 122 over which the associated node 112, 124 or 132 communicates. For example, in the case of a mobile device 112, a communication interface 224 can include an interface to a wireline or wireless carrier network, including but not limited to a cellular network, the public switched telephony network (PSTN), a satellite telephony network, or a wireline or wireless Internet protocol network. Moreover, different communication interfaces 224 can be used in different situations. For example, a mobile device 112 can include a relatively short range wireless communication interface 224, such as a Bluetooth or Wi-Fi network interface 224, for interfacing with an Internet protocol network 122. As another example, a mobile device 112 can include one or more relatively long range wireless communication interfaces 224, such as a cellular voice and/or data network or other wireless carrier network communication interface 224. Moreover, some or all of the available communication interfaces 224 can be used to interconnect a mobile device 112 including the communication interfaces 224 to a mobile connect server 124 or other node in the system 100. With respect to a mobile connect server 124 and/or a local client server 132, a communication interface 224 can include an Ethernet or other Internet protocol communication interface 224, for example for interconnecting to a network 122 comprising the Internet. As another example, a communication interface 224 associated with a mobile connect server 124 and/or a local client server 132 can include an interface to a proprietary satellite communication system. As can be appreciated by one of skill in the art after consideration of the present disclosure, different communication interfaces 224 can be used for different data and/or situations. For instance, a broadband communication interface 224 can interconnect a mobile connect server 124 to a telephony carrier's communication server for communicating with mobile devices 112 over a carrier wireless network. A broadband communication interface 224 to an Internet protocol network 122 connecting a mobile connect server 124 to one or more local client servers 132 can also be provided. As yet another example, a communication interface 224 that enables satellite communications between a mobile connect server 124 and one or more local client servers 132 can be provided.

Each node 112, 124 and 132 of a system 100 can be associated with different applications or application programming. These different applications can be stored in the data storage 212 of the associated node 112, 124 or 132. For instance, in the case of a mobile device 112, application programming can include a mobile app 228. As disclosed herein, the mobile app 228 can function to receive a pairing code that the mobile app 228 delivers to the mobile server system 124. In addition, the mobile app 228 can operate to display menus, channel guides, and interactive program guides or other information to a user 116, and to receive input from a user 116 that is relayed to the mobile connect server 124 for further action, such as to control the operation of a paired output device 136. The data storage 212 of the mobile device 112 can also store data, such as user preference data or information 230. As described in greater detail elsewhere herein, the user preference data 230 can be applied to control aspects of the user 116 experience. Moreover, in accordance with embodiments of the present invention, user preference data 230 can be applied by the mobile connect servers 124 and/or the local client server 132 to control aspects of the operation of an output device 136 and/or the features, behavior or other aspects of an interactive system with respect to the user 116 associated with an applied set of user preference data 230.

The mobile connect server 124 can store or maintain various applications and/or data in associated data storage 212. For example, global property data 232, including information received from interconnected local client servers 132 regarding programming available from particular local client servers 132 can be stored in data storage 212. As another example, mobile server data 236 can include information regarding registered mobile applications 228, and the current status of registered mobile apps 228. In addition, mobile server data 236 can include user preference data 230 for particular users 116 associated with registered mobile applications 228. Alternatively or in addition, user preference data 230 can be stored on the mobile connect server 124 apart from mobile server data 236. Mobile server data 236 can also include information identifying pairings between output devices 136 and mobile devices 112. As yet another example, mobile server data 236 can include channel guides, interactive program guides, movie schedules, TV show schedules, and the like in a format suitable for handling by a mobile app 228. Mobile server data 236 can additionally include output device 136 location information and/or location information for output devices 136 that have been paired to mobile devices 112. This location information can be stored as a latitude and longitude, an address of a property at which an output device 136 is located, and/or using other location identifying information. An example of an acceptable format of mobile server data 236 is an XML (extensible markup language) file. As another example, the data storage 212 of a mobile connect server 124 can include stored content 240. Stored content 240 can comprise generally available on demand content. As another example, stored content 240 can comprise content that is stored or recorded at the specific request of a user 116, for example for personal time shifting purposes. Accordingly, embodiments of the present invention can provide a virtual digital video recorder (DVR) service. As another example, the data storage 212 of the mobile connect server 124 can include a mobile server application 244. The mobile server application 244 can control various aspects and features of the functionality of the mobile connect server 124 with respect to interconnected mobile devices 112 and local client servers 132. For instance, the mobile server application 244 can respond to requests for pairing codes, and can associate a particular output device 136 with a particular mobile device 112 in response to receiving a pairing code from the mobile device 112 that matches the pairing code output by the output device 136. In addition, the mobile server application 244 can operate to receive commands input at the mobile device 112, and to control a paired output device 136 and/or cause content or other material to be delivered to an output device 136 and/or a mobile device 112 in response to such input. Other examples of programming and data that can be maintained in the data storage 212 of a mobile connect server 124 includes accounting data 248 that can track transactions and charges associated with a particular pairing and/or mobile device 112.

Examples of application programming and content that can be stored in the data storage 212 associated with a local client server 132 includes local property data 252. Local property data can include information regarding interconnected output devices 136, listings of stored and/or available content, location information related to the property or properties with which the local client server 132 is associated, and/or location information related to individual output devices 136 associated with the local client server 132. In addition, stored content 256, such as movies or other audio-visual content, can be maintained in the data storage 212. The data storage 212 of the local client server 132 also generally includes a local client server application 260. The local client server application 260 can handle interaction between the local client server 132 and the mobile or central server 124. In accordance with embodiments of the present invention, the local client server application 260 can also handle the delivery of pairing code information to an output device 136, and the delivery of content and/or control signals to connected output devices 136 in response to commands received from the mobile or central server 124. The data storage 212 of the local client server 132 can also include lodging or user stay information 264. Examples of user stay information 264 include records of transaction identifiers assigned to guests and associations of such transaction identifiers with one or more output devices 136, pairing codes, or subsequent identification codes. User stay information 264 can also include user preference data 230 for users 116 who have paired a mobile device 112 to an output device 136 that is interconnected to the local client server 132. Alternatively or in addition, user preference data 230 can be stored on the local client server apart from the user stay information 264.

Figure 3:
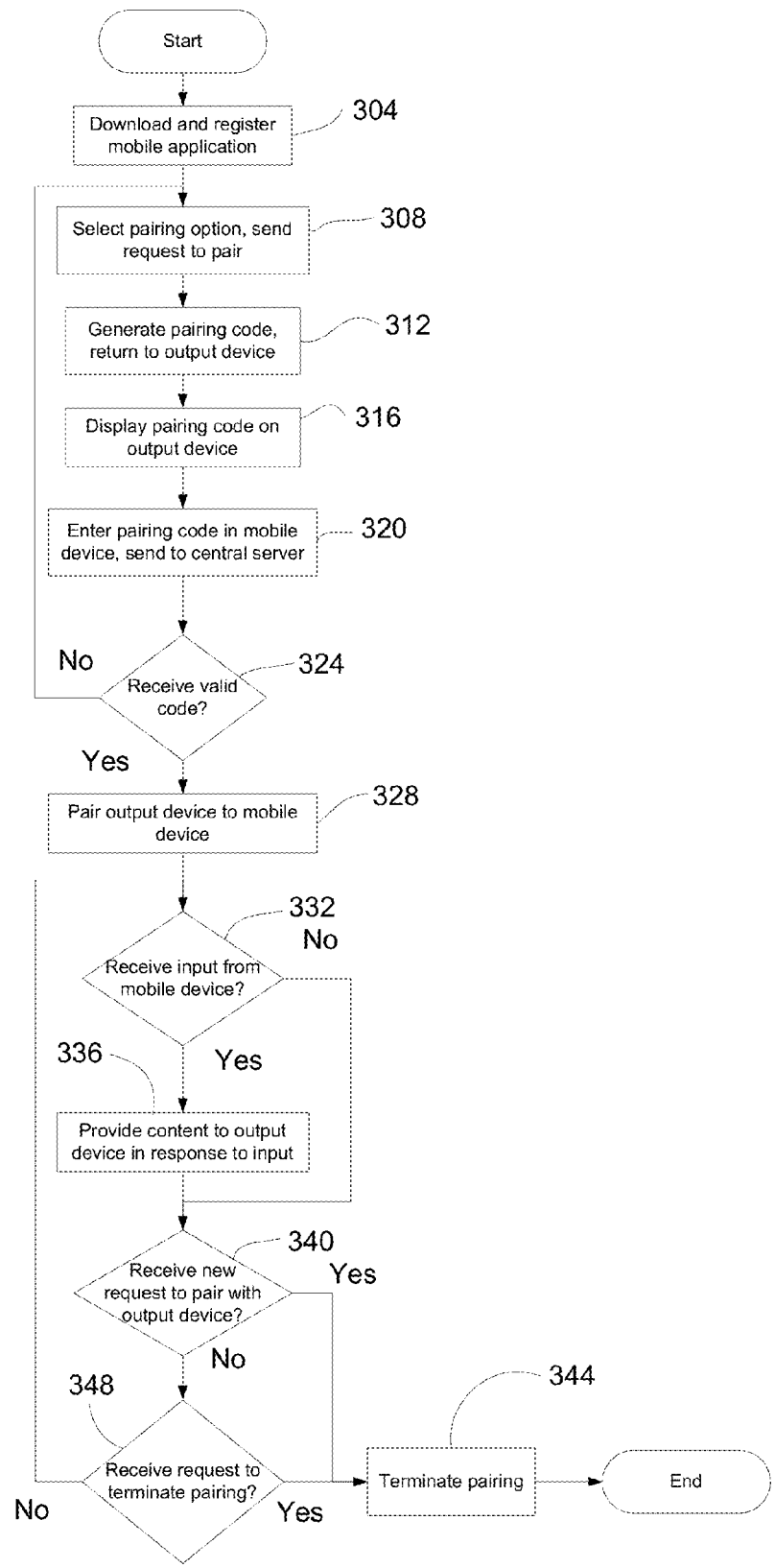
FIG. 3 is a flowchart depicting aspects of the operation of a system in accordance with embodiments of the present invention.

With reference now to FIG. 3, aspects of the operation of a system 100 in accordance with embodiments of the present invention are illustrated. Initially, at step 304, a user 116 becomes aware of the availability of the mobile app 228, and downloads the mobile app 228. In accordance with at least some embodiments of the system 100, the user 116 may be required to register the mobile app 228 as part of installing it on the user's 116 mobile device 112 (step 304). The mobile app 228 can be made available through various channels. For example, the mobile app 228 can be made available by the central server system 104, a mobile application server 120, a third party application provider, or other source. Typically, a user 116 will install the mobile app 228 to enable access to various functions and information through the mobile device 112, including access to information regarding nearby properties that have a local client system 108 that is compatible with the mobile app 228 and that features desired programming or other services, to enable previews of programming and views of channel guides and interactive program guides through the mobile device 112, to view services and features at particular properties, and/or to enable the control of aspects of the operation of a paired output device 136 through the mobile device 112. The mobile app 228 can also enable the application of user preference data 230 in controlling aspects of a user's 116 interaction with an output device 136 or other components or features of the interactive local client system 108, and/or with the central server system 132.

At step 308, the user 116 enters a selection to pair an output device 136 with the user's mobile device 112. As an example, once opened, the mobile app 228 can instruct the user 116 to turn on the output device 136 (e.g., a television in a hotel room), push menu, and select mobile application from the menu. Selection of the mobile app 228 item from the menu displayed by the output device 136 can cause a request for a pairing code to be passed to the central server system 104. More particularly, the output device 136 can send a signal to the local client server 132, via the local client network 140. The local client server application 260 running on the local client server 132 associates the request with a transaction identifier, also referred to as a LodgeNet™ stay ID, that is assigned by the local client system 108 for use in tracking transactions related to a particular room and/or guest (i.e., user) 116. The local client server 132 can then pass the request to the mobile connect server 124 of the central server system 104 via a communication channel established using an interconnecting communication network 122 or a direct communication link.

In response to receiving a request to pair at the central server system 104, a pairing code is generated and returned to the local client system 108 (step 312). In particular, the mobile server application 244 can operate to generate a temporary code or pairing code that is associated with the transaction identifier provided with the request, and that is returned back to the local client server 132. The local client server 132 then operates to provide the pairing code to the output device 136 from which the request was initiated, via the property distribution network 140. In addition, the mobile server application 244 can cause a record to be created associating the pairing code and the transaction and identifier and that is stored as part of mobile server data 236. Notably, neither the local client system 108 nor the central server system 104 is required to have information regarding the identity of the user 116 or mobile device 112, at least at this point in the transaction. The output device 136 displays or otherwise outputs the pairing code to the user 116 (step 316). The pairing code can be displayed as a user friendly series of characters. As an example, and without limitation, the pairing code can comprise a six digit number. Alternatively or in addition, a pairing code can comprise a computer readable code, such as a barcode or a quick response (QR) code that can be captured by a camera or scanner provided as part of or in association with the mobile device 112. As yet another example, a camera included in the mobile device 112 can capture the pairing code and apply optical character recognition. At step 320, the pairing code is entered in the mobile device 112, for example in a data entry field provided by the mobile app 228, and is sent to the central server system 104 via a communication network 122. Accordingly, entry of a pairing code can include manual entry of that pairing code by the user 116 into the mobile device 112 via a user input 216 provided as part of the mobile device 112. Alternatively, entry of the pairing code in the mobile device 112 can include the capture of a machine readable code through operation of a suitable capture facility provided by the mobile device 112 in response to commands entered by the user 116. Notably, the provision of a pairing code by the output device 136 that is entered or caused to be entered in a mobile device 112 by a user 116 is the only direct communication required between the output device 136 and the mobile device 112. Moreover, the pairing code can be transmitted from the mobile device 112 to the mobile connect server 124 of the central server system 104 using a network 122 that is separate from the network 122 interconnecting the central server system 104 to the local client system 108. Accordingly, a communication channel interconnecting the mobile device 112 to the mobile connect server 124 can be completely separate from a communication channel interconnecting the mobile connect server to the local client server 132 and/or the output device 136.

At step 324, a determination is made by the mobile connect server 124 as to whether a valid pairing code has been received. If a valid pairing code has not been received, the system can return to step 308, to wait for a further request to pair an output device 136 to a mobile device 112. If a valid pairing code is received, the mobile connect server 124 pairs the mobile device 112 from which the pairing code was received with the output device 136 that displayed the pairing code (step 328). A record of this pairing or association can be maintained in the mobile server data 236.

After a mobile device 112 has been paired to an output device or room terminal 136, the mobile device 112 can be used to control aspects of the operation of the output device 136. For example, the programming or other content or information displayed by the output device 136 can be controlled in response to input entered by the user 116 at the mobile device 112. In accordance with further embodiments, volume and other operating parameters of the output device 136 can be controlled through input entered at the mobile device 112.

The central server system 104 can continually monitor for input received from the mobile device 112, and in particular the mobile application 228 running on the mobile device 112

(step 332). Where input received from a paired mobile device 112 affects the output of the output device 136, for example in the form of a request to view a particular channel or item of content, the mobile connect server 124 can provide the requested content, for example a program from stored content 240 or an interactive program guide, from content stored on the central server system 104. Alternatively, the mobile connect server 124 can command the local client server 132 to stream content 256 stored by or in association with the local client server 132 to the output device 136, or to "tune" the output device 136 to a particular broadcast channel, etc. As yet another example, the input from the paired mobile device 112 can include input directing the output device 136 to output content provided by the mobile device 112 that is passed to the output device 136 through the mobile connect server 124 (step 336). After providing requested content or after determining that the input is not received from the mobile device 112, a determination can be made as to whether a new request to pair the mobile device 112 with an output device 136 is received (step 340). In general, a new request is received when a new pairing code is entered in the mobile application 228 of a mobile device 112, and where the new pairing code was generated in connection with a request from a new output device 136. In response to the receipt of a new pairing code from a previously paired mobile device 112, the original pairing can be terminated (step 344).

At step 348, a determination may be made as to whether a request to terminate pairing has been received by the mobile connect server 124. A request to terminate pairing can be initiated by a user 116 via the mobile app 228 running on the mobile device 112. A pairing can also be terminated when the user associated with a pairing checks out of or leaves the property at which the paired output device 136 is located. A request to terminate pairing can also be in the form of a request for a pairing code associated with the output device 136 that is also associated with a new transaction identifier. For example, a new transaction identifier can be used for a room that the output device 136 is associated with when the room is assigned to a new guest. As yet another example, termination of pairing can result from revocation of the transaction identifier associated with a pairing. If a request to terminate pairing is received, that previous pairing is terminated (step 344). The process may then end. So long as a condition resulting in the termination of an established pairing is not received, the process can continually check for input from a mobile device (step 332) and can provide content (step 336) as appropriate in response to received input.

In accordance with further embodiments of the present invention, pairing codes can expire after some predetermined period of time. In addition, the relatively short pairing code can be replaced by a longer pairing key that is exchanged automatically (i.e., without requiring manual entry or action by the user 116) after a successful pairing event, to enable the use of user friendly pairing codes, while providing an ability of the system 100 to service a large number of output device 136 and mobile device 112 pairings.

Although examples have been described in which a mobile device 112 is paired to a single output device 136, embodiments of the present invention can support simultaneous pairing of a mobile device 112 to multiple output devices 136. For example, with respect to a room or a suite having multiple televisions or other output devices 136, a mobile device 112 can be paired to those output devices 136 simultaneously. In accordance with still other embodiments, a pairing code output by a first output device 136 in a room or an associated room can be used to pair a mobile device 112 to a second output device 136 in the room or an associated room.

Figure 4:
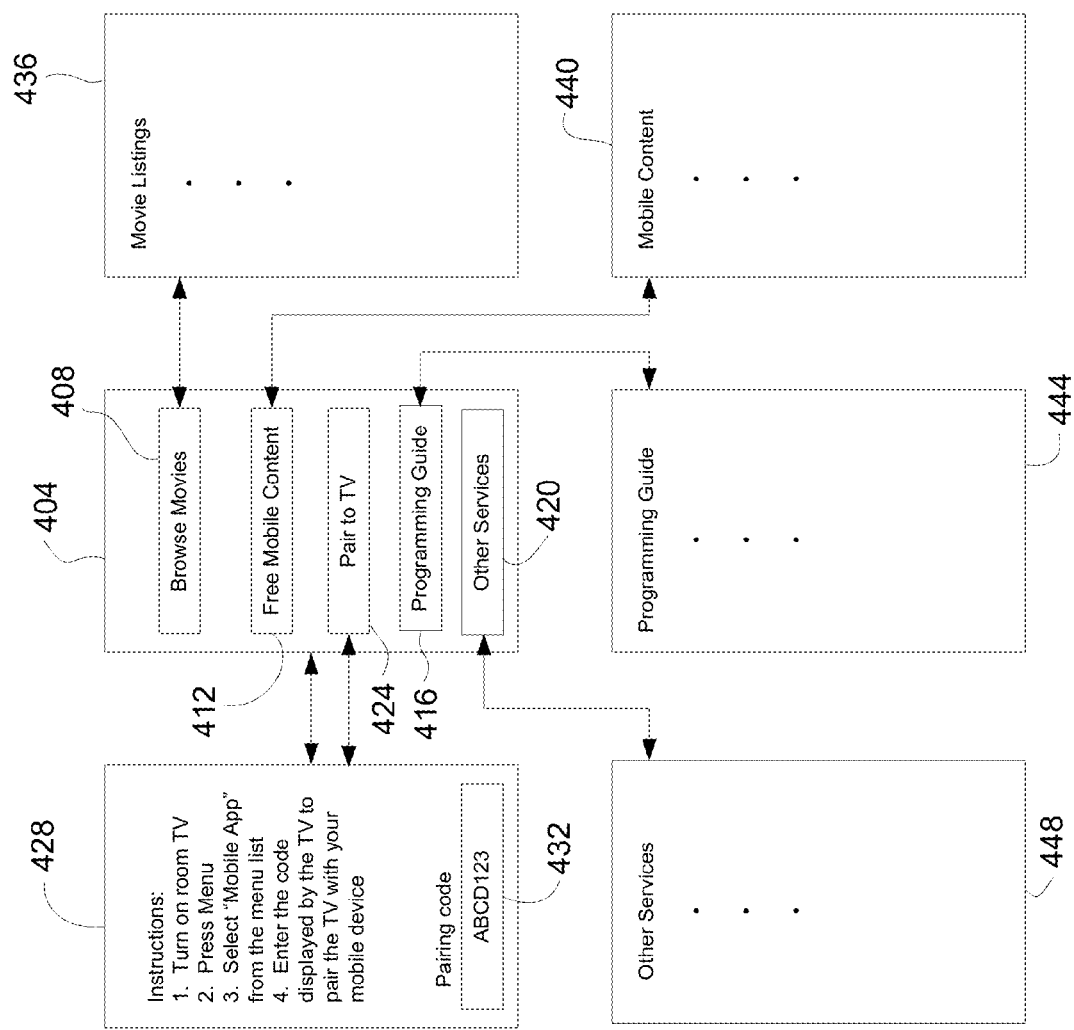
FIG. 4 depicts exemplary screenshots provided by a mobile application in accordance with embodiments of the present invention.

FIG. 4 is a set of screenshots illustrating output displayed by a mobile app 228 in accordance with exemplary embodiments of the present invention. In an initial or welcome screen 404, a top level menu 404 can be presented to the user 116. The top level menu 404 can display a series of options, such as an option to browse movies 408, access free mobile content 412, access a program guide 416, or access other services 420. In addition, the option to pair to a TV 424 (i.e., to an output device 136) can be presented. In accordance with at least some embodiments, the top level menu 404 can be accessed and can present at least some options even in the absence of a successful pairing. For example, free mobile content 412, programming guides 416, and other services 420 can be at least partially available in the absence of a current pairing between a mobile device 112 and an output device 136. Accordingly, the mobile device 112 through execution of the mobile app 228 can be used to view programming options, for example by location, property, time and date, or other parameter or set of parameters, or to access other services and features, even when the mobile device 112 is not paired with an output device 136.

In response to a selection of the option to pair the mobile device 112 to a TV 424, the mobile app 428 can display a pairing screen 428. The pairing screen can provide instructions for completing pairing between the mobile device 112 and an output device 136. In addition, a field 432 can be provided in which a pairing code displayed to the user 116 by an output device 136 can be entered by the user 116. After the successful entry of a valid pairing code, additional features or options can be enabled. For example, in response to entry of a valid pairing code, the mobile device 112 can again display the initial or welcome screen 404, and certain options that were previously inactive, such as a browse movies option 408 is now active. Alternatively or in addition, additional categories or options can be presented.

In response to a selection of the browse movies item 416, movie listings 436 can be presented. The movies included in the movie listings are generally movies available from the local client server 132 associated with the output device 136 to which the mobile device 112 is paired. In response to a selection of the free mobile content option 412, a listing of mobile content 440 can include listings of content available for viewing on the mobile device 112. In response to the selection of the programming guide option 416, a programming guide page 444 can be presented to the user 116. The programming guide 444 generally contains programming that is accessible through the paired output device 136. The selection of the other services option 420 presents another services page 448 to the user 116. Examples of other services include content that has been recorded for personal time shifting purposes by the user 116. In connection with recorded material, the user 116 can order or otherwise arrange for the recording of selected content, for example through a request that is provided to the central server system 104. Moreover, such a request can be made via an interface provided by the mobile app 228. The interface for ordering the recording of specified content can be provided by the other services page 448. Moreover, that content can be ordered through the other services page 448. The recorded content can be maintained at the central server system 104, and can be delivered to the local client server 132 associated with the output device 136 to which the mobile device 112 is paired. Moreover, the delivery to the local client server 132 of recorded content can be initiated after the appropriate local client server 132 for delivery of the recorded content to the user 116 has been identified, for example in connection with a successful pairing operation, or in response to a request for that content, for example through a command entered using the mobile app 228.

In accordance with other embodiments, a mobile connect server 124 may comprise a server having a well known address that can be contacted by a mobile app 228. In accordance with further embodiments of the present invention, a mobile app 228 can establish communication with a local client server 132 directly, rather than through a mobile connect server 124. In accordance with still other embodiments, a mobile connect server 124 can communicate with output devices 136 without requiring an intervening local client server 132.

In accordance with embodiments of the present invention and as described herein, information regarding the location of a mobile device 112 and/or an output device 136 paired to a mobile device 112 can be used to provide relevant information to a user. For example, a set of movie listings 436 and/or a programming guide 444 can be tailored to include only those listing available at the current location of the mobile device 112 and/or the location of the property including the output device 136 with which the mobile device 112 is paired. In addition, the location of a mobile device 112 can be used to provide that mobile device 112 with other services 448 that require or that can benefit from the location information. In accordance with embodiments of the present invention, the location of the mobile device 112 can be determined based on the pairing of the mobile device 112 with an output device 136. In particular, embodiments of the present invention include a mobile server application 244 that has or can access the location of an output device 136 paired with a mobile device 112. From the location of the output device 136, the location of the mobile device 112 can be inferred, even if the user of the mobile device has disabled conventional location services or has otherwise declined to provide location information. In accordance with still other embodiments, the location information derived from the location of a paired output device 136 can be provided to the mobile app 228 running on or associated with the mobile device 112 paired with that output device 136. The mobile app 228 can then use the location information in connection with location based services, even if the user of the mobile device 112 has disabled other location services.

Figure 5:
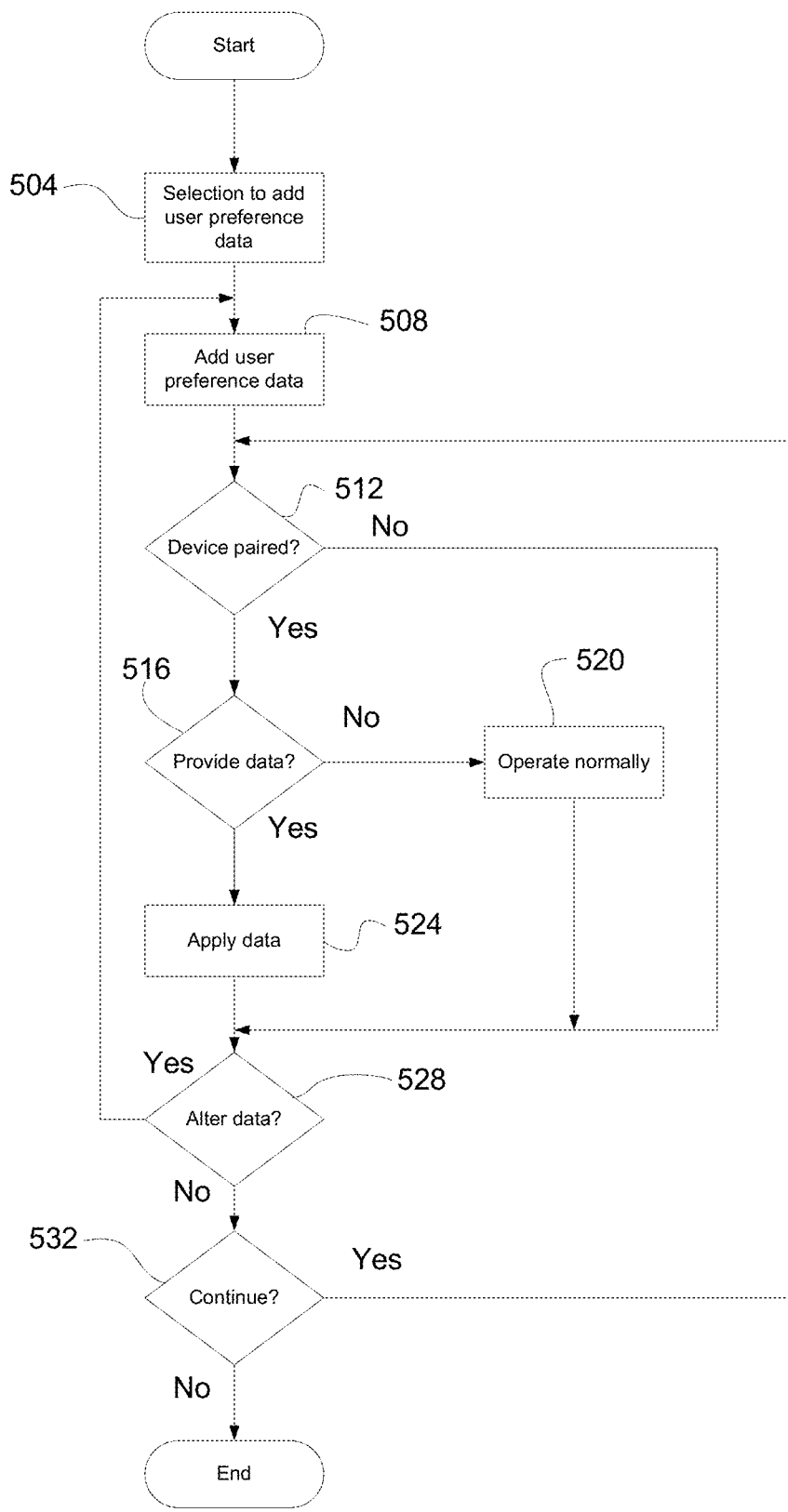
FIG. 5 is a flowchart depicting additional aspects of the operation of a system in accordance with embodiments of the present invention.

FIG. 5 is a flowchart depicting further aspects of the operation of a system 100 in accordance with embodiments of the present invention. Initially, at step 504, the user 116 selects an option to add user preference data 230 in connection with a mobile application 228. The user 116 then enters user preference data 230 (step 508). The selection of the option to add user preference data 230 can be made through interaction by the user 116 with the mobile application 228. Accordingly, the entry of user preference data 230 can be made in connection with a user input 216 provided by a mobile device 112 running in mobile application 228. Alternatively or in addition, the entry of user preference data 230 for association with a mobile application 228 can be made through another device, and that user preference data 230 can then be loaded onto the mobile device 112 of the user 116. Moreover, the entry of user preference data 230 can be independent or in the absence of a pairing between a mobile device 112 and an output device 136. In addition, although user preference data 230 can be stored in memory 208 and/or data storage 212 associated with a mobile device 112, embodiments of the present invention also can include storage of user preference data 230 in a user data store 118 that is separate from the mobile device 112. Moreover, user 116 can store user preference data 230 on multiple mobile devices 112, and/or can access user preference data 230 stored in a user data store 118 accessible to one or more mobile devices 112 over a communication network 122, for application by one or more mobile devices 112 running a mobile app 228 as described herein. A user 116 can also create multiple sets of different user preference data 230. For example, a user 116 may define a first set of user preference data 230 to use during business travel, and a second set of user preference data 230 to use during vacation travel.

After the entry of user preference data 230, a determination can be made as to whether the mobile device 112 associated with user preference data 230 has been paired to an output device 136 (step 512). If pairing has been completed, a determination can next be made as to whether the user preference data 230 should be provided to the mobile connect server 124 and/or the local client server 132 for application in connection with the operation of the output device 136 and the interaction between the mobile device 112 and the output device 136 and/or the interactive local client system 108 (step 516). The determination as to whether to send user preference data 230 can be made with reference to user selections that have been made with respect to the operation of the mobile app 228. A user 116 can also manually control the provision of user preference data 230 to other nodes in the system 100. Moreover, automatic or manual control can be applied in connection with selecting a particular set of user preference data 230 to apply, determining whether an entire set of user preference data 230 is to be applied, determining whether to apply portions of user preference data 230, and determining whether an individual item of user preference data 230 is to be applied. If user preference data is not sent to the mobile connect server 124 or the local client server 132, the system 100 operates normally (e.g., it applies its default configuration or an administered configuration), without modification by user preference data 230 (step 520).

If user preference data 230 is provided to the mobile connect server 124 and/or the local client server 132, the user preference data 230 can be applied to control aspects of the user experience or interaction with respect to the output device 136 and the associated interactive system (i.e., the local client system 108 and/or the central server system 104) (step 524). As an example, the channel lineup available through the output device 136 can be modified as compared to the channel lineup available in the absence of the user preference data 230. Examples of modifications include blocking channels that the user 116 does not wish to access, enabling channels that the user 116 does wish to access, altering channel lineups to arrange available channels in a preferred order, selecting a preferred default or power on channel, selecting a preferred language for audio output and/or subtitles, etc. With respect to enabling certain channels, user preference data 230 can include subscription or billing information to enable channels that are not offered on a free to guest basis. As still other examples, user preference data 230 can enable virtual channels that a user 116 can use to access personal data, including programs recorded as a result of the implementation of a virtual digital video recorder (DVR) function of the system 100, access to data stored on the mobile device 112, or a server 118, 120, or access to data stored on or available from other addressable data sources. Application of the user preference data 230 can be by the central server system 104 and/or the local client system 108. Moreover, the user preference data 230 can include instructions to control aspects of the operation of a mobile device 112 and/or an interface with components of the central server system 104 and/or the local client system 108.

At step 528, a determination can be made as to whether a selection to alter user preference data 230 has been entered. If such a selection has been made the process can return to step 508, where the altered user preference data is entered. If a selection to alter preference data has not been received, a determination can next be made as to whether the process should continue (step 532). If the process is to continue, it can return to step 512. Alternatively, the process can end.

FIG. 6 illustrates an example channel lineup 604 available to a user 116 through an output device 136. More particularly, the channel lineup 604 in this example includes alterations based on the application of user preference data 230 as described herein. More particularly, a number of channels are identified by name 608 and display number 612. The named channels 608 represent television channels or other sources of information available at a paired output device 136 associated with a particular local client system 108. The display channel 612 indicates the numerical channel to which the output device 136 should be tuned to access the associated named channel 608. A column of channel mask data 616 indicates whether a particular channel 608 is actually available to the user 116. In particular, channels marked with a bullet point (•) are available to this user 116 through the associated output device 136 by default, and can be selected by, for example, the facility at which the output device 136 is located. Channels for which no marking is included in the associated channel mask 616 field could be viewed on the associated output device 136, but are not accessible by default. Accordingly, such channels need to be added, for example through a subscription or on a pay per view basis. Channels having an X in the associated channel mask 616 field are blocked as a result of the application of user preference data 230. As an example, a user 116 can choose to block individual channels, for example as a way to implement parental controls. Channels for which an asterisk (*) is shown in the channel mask indicate channels that are not available by default, but that have been added as a result of the application of user preference data 230. For example, a user 116 may subscribe to particular channels, in which case information regarding the user's 116 subscription can be included in the user preference data 230. That subscription information can then be applied to make such channels available through a paired output device 136. Accordingly, user preference data 230 can be used to control the channels available through a paired output device 136. User preference data 230 can also be used to provide information required to address user 116 specific information. For example, through a reserved channel provided by the local client system 108, a user can access a virtual DVR containing recorded programming. As a further example, user preference data 230 pointing to an Internet or other address accessible through the local client system 108 containing user 116 specific information, such as user data stored on the mobile device 112, or some other node within the system 100, can be delivered to the output device 136. Accordingly, the user preference data 230 can be used to provide the user 116 with access to various sources of information, and to provide the user 116 with a consistent user experience across different local client systems 108 and output devices 136.

User preference data 230 can therefore be used to control various aspects of the user 116 experience in connection with an interactive system such as a local client system 108 and associated output devices 136. In addition to controlling available channels, user preference data 230 can be applied to control the display number at which channels are located, the channel initially displayed when an output device 136 is powered on, user alarm settings, the provision of subscription information necessary to access subscription television channels, payment information necessary to access pay per view channels, access to sources of information available from network nodes or other connected devices, and the like.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

What is claimed is:

1. A method, comprising:

receiving user preference data;

storing the received user preference data;

generating a first pairing code using a first server, wherein the first server is interconnected to a plurality of output devices at different geographic locations, wherein the first pairing code is generated by the first server in response to a request from a first output device included in the plurality of output devices, wherein the first pairing code is generated prior to any communication between the first output device and a first user device, and wherein the first output device sends the request to the first server using a first communication channel;

communicating the first pairing code from the first server to the first output device;

communicating using the first output device included in the plurality of output devices the first pairing code to the first user device, wherein the first user device first receives the first pairing code as a result of the communicating by the first output device;

communicating the first pairing code from the first user device to the first server, wherein the first user device sends the first pairing code to the first server using a second communication channel, and wherein the first communication channel is separate from the second communication channel;

in response to receiving by the first server the first pairing code communicated from the first user device, associating by the first server the first user device with the first output device;

providing the stored user preference data to at least one of the first server and a second server, wherein the stored user preference data is associated with the first user device;

applying the user preference data by the at least one of the first server and the second server, to control aspects of operation of the first output device.

2. The method of claim 1, wherein communicating using the first output device the first pairing code to the first user device includes:

displaying the first pairing code to a first user using the first output device.

3. The method of claim 2, wherein communicating using the first output device the first pairing code to the first user device further includes:

the first user entering the first pairing code in the first user device.

4. The method of claim 1, wherein the second communication channel that sends the first pairing code from the first user device to the first server includes a wireless carrier network.

5. The method of claim 1, further comprising:
receiving at the first server a first request for a pairing code from the first output device, wherein the first request for a pairing code is associated with a first transaction identifier and at least one of a first output device identifier, a first property identifier, a first room identifier, and a first user device identifier, and wherein the first server generates the first pairing code in response to the first request for a pairing code received from the first output device.

6. The method of claim 5, wherein the first request for a pairing code is associated with at least a first user device identifier, wherein the first user device is registered with the first server.

7. The method of claim 5, further comprising:
disassociating the first user device and the first output device in response to receiving at the first server a second request for a pairing code, wherein the second request for a pairing code is associated with a second transaction identifier and at least one of the first output device identifier, the first property identifier, and the first room identifier.

8. The method of claim 5, wherein the first pairing code expires after a first predetermined time has elapsed since the first request for a pairing code was received at the first server.

9. The method of claim 1, further comprising:
after associating the first user device with a first output device, receiving a request for first output from the first user device at the first server; and
displaying the first content using the first output device.

10. The method of claim 1, further comprising:
registering the first user device with the first server;
receiving by the server an instruction contained in the user preference data to make first content available;
after associating the first user device with a first output device, receiving a request for the first content from the first user device at the first server;
displaying the first content using the first output device.

11. The method of claim 1, further comprising:
retrieving a stored location of the at least one of the first output device and the second output device;
applying the stored location as a location of the first user device.

12. A system, comprising:
a plurality of output devices;
a first mobile device;
a mobile connect server, including:
memory;
application programming, wherein the application programming is stored in the memory;
a processor, wherein the processor is operable to execute the application programming;
a communication interface, wherein the mobile connect server is interconnected to the plurality of output devices by at least a first network, wherein the application programming is operable in response to a request received from a first output device included in the plurality of output devices to generate a first pairing code and to provide the first pairing code to the first output device included in the plurality of output devices using a first communication channel that includes the at least first network, wherein the request from the first output device is received by the application programming prior to any communication between the first output device and the first mobile device, wherein the first pairing code is provided by the first output device and is entered in the first mobile device, wherein the mobile device transmits the first pairing code entered in the first mobile device to the mobile connect server using a second communication channel, wherein after transmitting the first pairing code to the mobile connect server the application programming is operable to pair the first mobile device to the first output device;
a plurality of local client severs, wherein the at least a first network interconnects the mobile connect server to at least a first local client server included in the plurality of local client servers, and wherein the first communication channel includes the first network;
a first local client network, wherein a first local client server included in the plurality of local client servers is interconnected to at least some output devices included in the plurality of output devices by the first local client network, and wherein the second communication channel does not include the first local client network;
user preference data associated with the first mobile device, wherein the user preference data controls aspects of the operation of at least one output device included in the plurality of output devices.

13. The system of claim 12, wherein a first command entered at the first mobile device is received by the first local client server, and wherein in response to receiving the first command the first local client server delivers content to the first output device.

14. The system of claim 12, wherein the first local client network is a part of the at least a first network, wherein the first local client server includes a content store, and wherein the first content is delivered from the first local client server to the first output device over the local client network.

15. The system of claim 14, wherein the first mobile device is associated with a first user, the first mobile device including:
a communication interface;
a display;
a user input, wherein the first mobile device is interconnected to the mobile server by the at least a second network, wherein the mobile device is operable to receive the first pairing code through the user interface, wherein the mobile device is operable to transmit the first pairing code to the mobile server using the at least a second network, wherein the mobile device is operable to receive and display a content menu, wherein in response to an input at the user input selecting an item included in the content menu the first mobile device is operable to send a content selection message to the mobile server using the second communication channel.

16. The system of claim 15, wherein in response to receiving the content selection message the mobile server sends the first command to the first property management server.

17. The system of claim 12, wherein the first mobile device is associated with a first user, the first mobile device including:
a communication interface;
a user input, wherein the first mobile device is interconnected to the mobile server by the at least a second network, wherein the mobile device is operable to receive the first pairing code through the user interface, and wherein the mobile device is operable to transmit the first pairing code to the mobile server using the at least a second network.

18. A method for ordering content, comprising:
receiving at a mobile connect server a request from a first output device to pair the first output device with a first mobile device, wherein the request is sent from the first output device to the mobile connect server using a first communication channel, wherein the request from the first output device is received at the mobile connect server prior to any communications between the first output device and the first mobile device;
in response to the request to pair the first output device with the first mobile device, providing by the mobile connect server a first pairing code to the first output device using the first communication network;
presenting by the first output device the first pairing code to a user of the first mobile device;
entering by the user the first pairing code in the first mobile device;
sending the first pairing code from the first mobile device to the mobile connect server, wherein the first pairing code is sent from the first mobile device to the mobile connect server using a second communication channel;
in response to receiving the first pairing code sent from the first mobile device at the mobile connect server, the mobile connect server issuing a first pairing key to the first mobile device, and associating the first output device and the first mobile device;
providing user preference data;
storing the user preference data;
applying the user preference data to control aspects of the operation of the first output device.

19. The method of claim 18, further comprising:
displaying an option on the first output device to pair to a mobile device;
receiving user input at the first output device selecting the option to pair with a mobile device;
sending the request to pair with a mobile device from the first output device to the mobile connect server using the first communication channel.

20. The method of claim 19, further comprising:
providing an interactive menu from the mobile connect server to the first mobile device, wherein the interactive menu includes a first menu item;
receiving by the first mobile device a selection by the user of the first menu item;
in response to the selection of the first menu item by the user, the mobile connect server causing content related to the first menu item to be displayed on the first output device.

21. The method of claim 1, wherein the first communication channel includes a first local client server, and wherein the second communication channel does not include the first local client server.

* * * * *